United States Patent [19]

Watt et al.

[11] Patent Number: 5,072,356

[45] Date of Patent: Dec. 10, 1991

[54] LADDER DRUM SEQUENCE CONTROLLER

[75] Inventors: Kim J. Watt, Milwaukee; Charles C. Ksicinski, Whitefish Bay; Gary A. Romanowich, Wauwatosa; Richard L. Ryan, Waukesha, all of Wis.

[73] Assignee: Square D Company, Palatine, Ill.

[21] Appl. No.: 504,057

[22] Filed: Apr. 2, 1990

Related U.S. Application Data

[63] Continuation of Ser. No. 180,093, Apr. 11, 1988, abandoned.

[51] Int. Cl.$^5$ .............................................. G05B 11/01
[52] U.S. Cl. ..................................... 364/140; 364/136
[58] Field of Search ............... 364/136, 140, 141, 146, 364/147, 900 MS File, 143

[56] References Cited

U.S. PATENT DOCUMENTS

| | | | |
|---|---|---|---|
| 3,686,639 | 8/1972 | Fletcher et al. ..................... | 364/200 |
| 4,025,902 | 5/1977 | Nakao et al. ........................ | 364/147 |
| 4,038,533 | 7/1977 | Dummermuth et al. .......... | 364/147 |
| 4,247,909 | 1/1981 | Bradley et al. ..................... | 364/147 |
| 4,449,180 | 5/1984 | Ohshima et al. .................... | 364/147 |
| 4,564,898 | 1/1986 | Yano .................................. | 364/140 |
| 4,683,549 | 5/1987 | Takaki ............................... | 364/900 |
| 4,742,443 | 5/1988 | Rohn et al. ......................... | 364/136 |

OTHER PUBLICATIONS

"Microprocessors and Programmed Logic", K. L. Short, pp. 446-449, 1981.

Primary Examiner—Jerry Smith
Assistant Examiner—Jim Trammell
Attorney, Agent, or Firm—Michael J. Femal; Thomas K. Stine

[57] ABSTRACT

A drum-type sequencer operable in a ladder logic program and capable of being selectively stepped in various modes; that is, in forward stepped sequence, nonsequentially, and backward.

6 Claims, 4 Drawing Sheets

LADDER DRUM SEQUENCE CONTROLLER

This application is a continuation of application Ser. No. 07/180,093, filed on Apr. 1, 1988 and now abandoned.

DESCRIPTION

1. Reference to Related Applications

This application is related to applications filed concurrently herewith, entitled "Network Communications System" U.S. Pat. No. 4,912,623; "Peer-To-Peer Register Exchange Controller for PLCs" U.S. Pat. No. 4,897,777; "High-Speed Press control System" Ser. No. 07/179,743 filed 4/11/88; and, "Network Interface Board System" Ser. No. 07/179,756 filed 4/11/88. The contents of these applications are incorporated herein by reference.

2. Technical Field

This invention relates generally to drum-type sequencers operable in a ladder logic program.

BACKGROUND OF THE INVENTION

In the operation of machine tools such as punch presses and screw machines, the turning on and turning off of switches and valves often relate to the rung ladder programs previously used to operate the relays associated with prior controllers for such devices. This insures correct operation of the machine tool from an initial reset condition to the proper position to perform its operation at a proper time and location. Stating the matter in a negative sense, this prevents a machine such as a punch press from attempting to stamp a part from a tray that normally would be clear of the tool.

SUMMARY OF THE INVENTION

In accordance with the invention, a programmable logic controller or PLC furnishes a drum-type sequencer contained in firmware to memory step or scan an array of addresses and switches sequentially and sense or be responsive to time inputs, to event inputs, or to a combination of time and event inputs. The operation may be stepped sequentially or non-sequentially and may be operated both forwardly and backwardly.

DESCRIPTION OF THE PREFERRED EMBODIMENT

Figure 1:
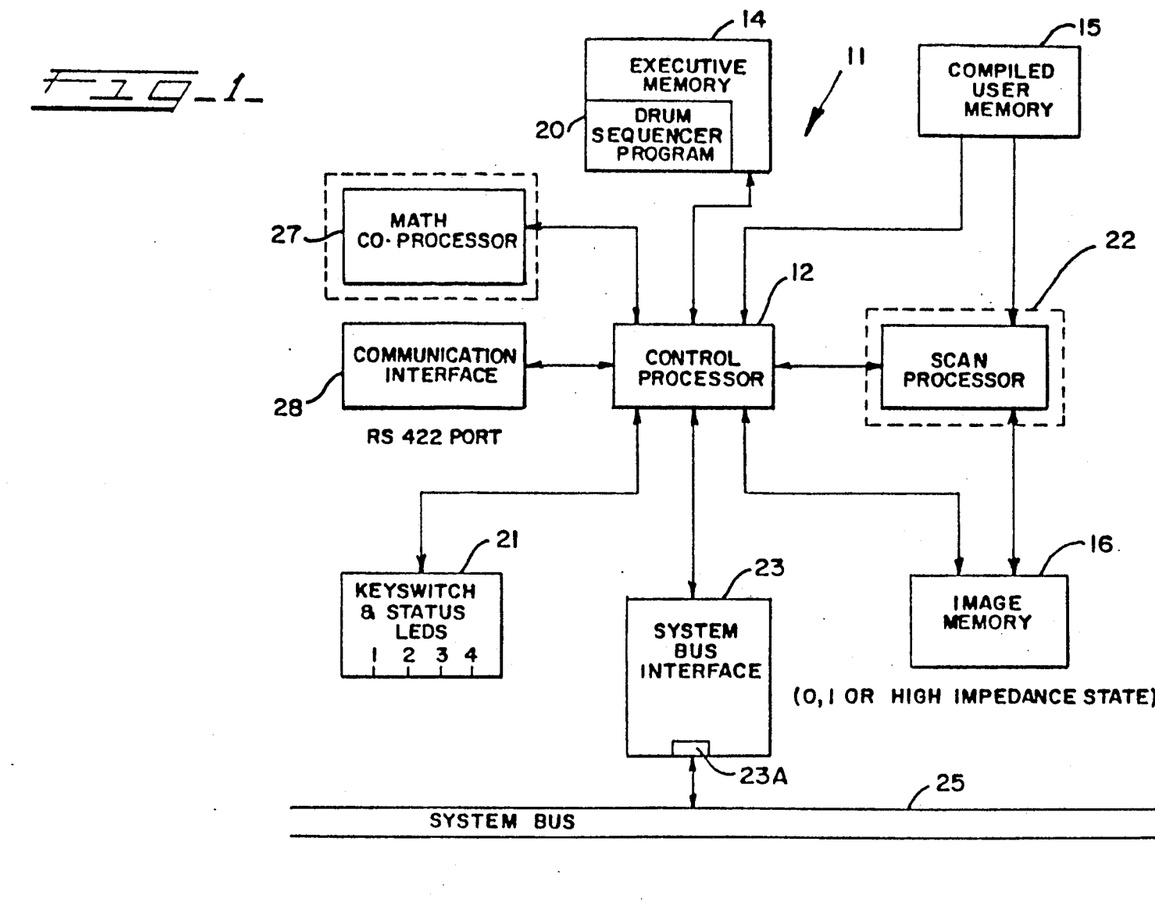
FIG. 1 is a block diagram showing a drum-type function sequencer in accordance with the invention, positioned in the executive memory of a programmable logic controller.

FIG. 1 shows a block diagram of a communications system 11 including a drum-type function drum sequencer 20. The system 11 of FIG. 1 includes a control processor 12, which may be of suitable known design, provides management functions for the system and coordinates the operation of all the components of system 11.

System 11 includes an executive memory 14 (which may be part of the control processor 12), and executive memory 14 includes the drum-type function sequencer 20. system 11 further includes a compiled user memory 15, a communications interface 28, a system bus interface 23, an image memory 16, and a keyswitch 21. The information to and from the system bus 25 is provided through system bus interface 23 and its port 23A. The system 11 includes a scan processor 22 and math co-processor 27.

Control processor 12 either performs or coordinates all processor system 11 operations. This includes performing all communication via a communications interface port and a master bus, and handling all interrupts and error conditions from the scan processor, communications interface network bus, and the remainder of the programmable controller system.

In a second embodiment of the invention, a scan processor is not included in the system of FIG. 1. In such case the control processor 12 functions as a scan processor. Similarly, a math co-processor 27 may not be included in the system 11 and the control processor 12 accomplishes this math function.

Executive memory 14 comprises firmware and includes the drum-type sequencer 20. Compiled user memory 15 comprises a RAM and in operation contains a compiled version of the executive memory to serve as executable instructions for the scan processor 22. The compiled user memory 14 is randomly accessible by the control processor 12 for purposes of loading and editing user programs. The scan processor 22 accesses the compiled user memory 15 as an executive memory of successive instructions. The compiled user memory 15 provides the ladder rung, rack addressing, and label data to requesting devices connected to the communications ports. This RAM is implemented with static CMOS devices which are battery backed and parity protected.

The image memory 16 receives the input data from the control processor 12 and stores it for access by the scan processor 22. Keyswitch and status LED 21 provide a turn-on control and status indicator for the system. Importantly, the inventive system 11 including the drum sequencer 20 allows the outputting of information based on either, or both, time driven or event driven conditions.

Figures 2, 3, 4:
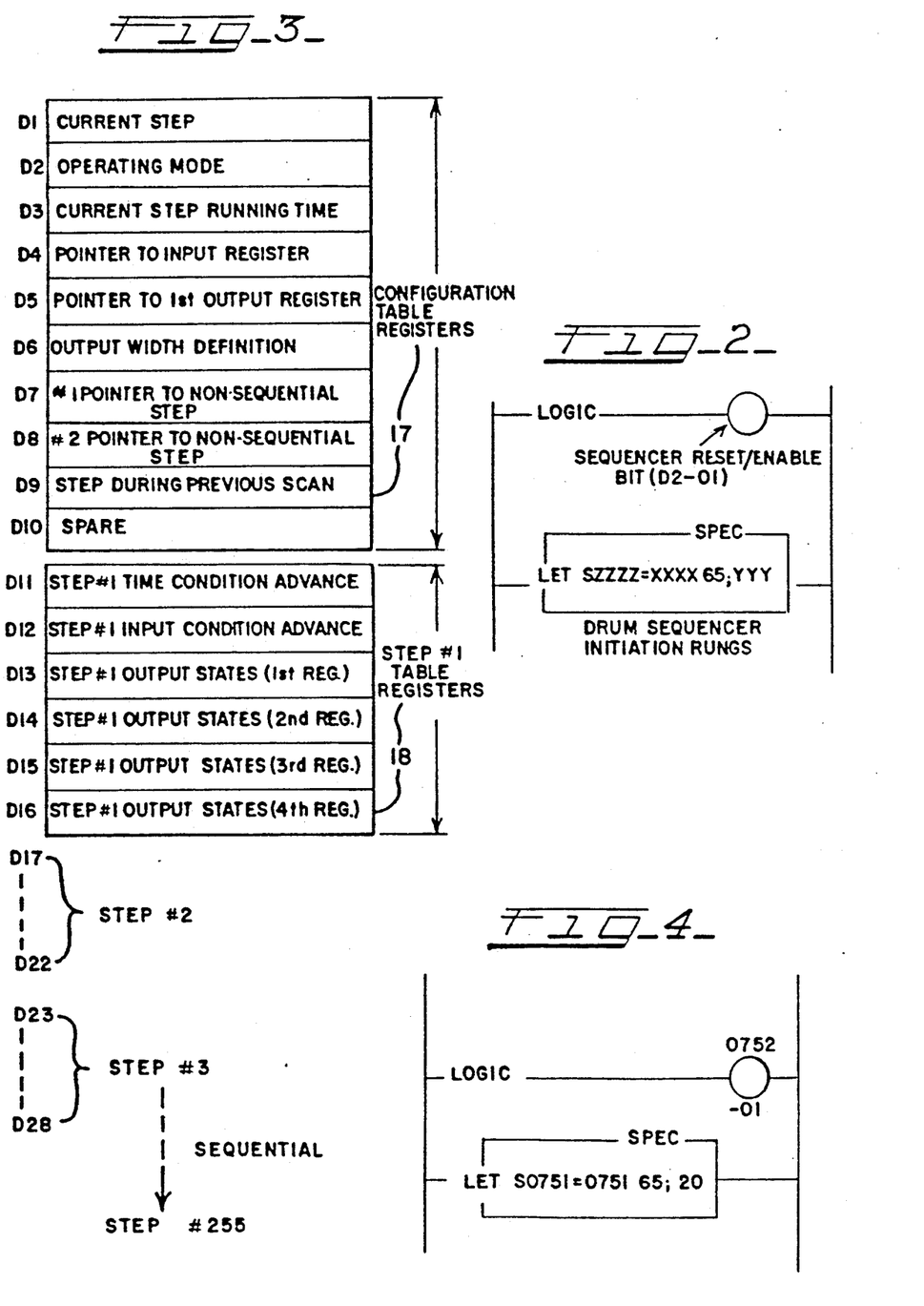
FIG. 2 shows a sequencer coupled in a rung of a ladder array.
FIG. 3 shows the configuration table register and the step table registers of the sequencer.
FIG. 4 shows an example of a drum-type sequencer in a ladder program.

Refer now to FIG. 2 which shows that the sequencer 20 is operated in a ladder configuration. As indicated in FIG. 2, a minimum of two rungs are required for the sequencer operation. The logic in the first rung allows the sequencer to be reset, or enabled. The second rung specifies the addresses and instructions. The required entries to the sequencer 20 for operation will be discussed hereinafter.

FIG. 3 depicts the memory register allocation for the sequencer 20. Registers D1–D10 are the configuration table registers and serve to define the operating conditions for all of the possible 255 steps in the sequence function. Each of the 255 steps is then defined by six sequential register positions. Since each step requires six registers, the total number of registers required for each sequencer is given by the relation.

$$[6 \times (\text{number of steps}) + 10]$$

Refer now to the configuration table registers designed generally as 17 and individually as D1 through D10 of FIG. 3.

The following registers are part of the basic set-up procedure and must be included in the sequencer program.

Register D1 contains the step number currently being carried out by the sequencer. This number can be changed by the user, and will result in the sequencer immediately going to the newly changed step.

Register D2 is the Operating Mode or Status register. All of the main operating conditions for the sequencer are contained in this register.

Register D3 will contain the amount of time that the current step has been executing. A step advance will be enabled when this register is incremented to equal the "step time" condition.

Register D4 contains the address of the register that will contain the input. Bits in the register being pointed to will be compared to the "step input" condition.

Register D5 contains the address of the first output register, and is, therefore, a pointer. The "step output" will be written to the register to which this register is pointing.

Register D6 controls the width of the output data, as defined in bits. The width of the output data can be varied by the user, from 1 to 64 bits. This register will therefore determine how many 16-bit registers will be required to make up the output register, beginning with the register that is pointed to by D5.

Register D7 points to a step that is not in sequence. This register contains the address of an out-of-sequence step that will be used only if bit 8 of register D2 is set. Setting bit 8 of D2 is not the only condition required to cause the sequencer to move to the step in D7; the out-of-sequence jump will also require that all other conditions for advancing out of the current step are satisfied.

Register D8 functions the same as register D7, except that it uses bit 9 as the signal to step out of sequence, provided bit 9 is set, and all other step advance conditions are met.

Register D9 holds the step number of the previous scan. The sequence will immediately go to the new step (as pointed to in D1) if register D9 is not equal to register D1.

Register D10 is a spare.

FIG. 3 also indicates the step table registers for the first step, generally labeled as 18 and individually as D11–D16.

Each set of six step table registers apply to one particular step in the sequence. The fixed size for each step table register block is six registers long. A description of each of the six registers follows.

Register D11 (D17 in step 2, D23 in step 3, etc.) is the time condition advance register. The register contains the user specified step time of this step. This time is entered in 0.1 second increments. When this time is equal to the Running Time Register D3, a step advance based on time is enabled. This register will be strictly input driven (with time ignored) if this register is set to zero.

Register D12 (D18 in step 2, D24 in step 3, etc.) is the input condition advance register. This register contains the bits that must be set at the input, before the sequencer will recognize that the required input conditions have been met. Upon the inputs matching this register, the step advance condition is recognized (see FIG. 7). If this register is equal to zero, then the step advance is based solely on time, and the input conditions are completely ignored.

Register D13 (D19 in step 2, D25 in step 3, etc.) is the step 1 output states (1st register). This register contains the first 16 output bits for each of the respective sequence steps. These bits are written to the "pointed at" register from the first output register for the current sequence step.

Register D14 (D20 in step 2, D26 in step 3, etc.) is the step 1 output states (2nd register): It is the same as output register 1, except that these are the output states for the second register.

Register D15 (D21 in step 2, D27 in step 3, etc.) is the step 1 output states (3rd register). It is the same as output register 1, except that these are the output states for the third register.

Register D16 (D22 in step 2, D28 in step 3, etc.) is the step 1 output states (4th register). It is the same as output register 1, except that these are the output states for the fourth register.

Figure 5:
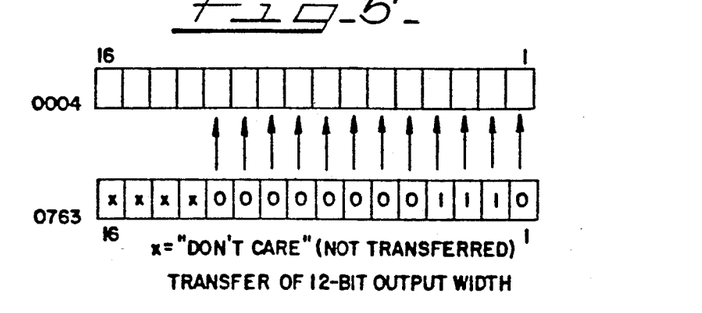
FIGS. 5, 6, 7 and 8, depict register bit conditions.

Note that there can be a 64-bit output and each register holds 16 bits, therefore four registers are required. Less than 16 bits may also be transferred as indicated in FIG. 5.

Register D2 provides an important control function. A listing of the purpose of various bits in register D2 follows.

| Register D2 Bit Number | Purpose |
|---|---|
| 1 | Reset/Enable Sequencer ("1" = ENABLE, "0" = RESET) When initially enabled, sequencer begins with step 1. Outputs pointed to by registers D5 and D6 will assume the state dictated by Step Register D13 (and D14–D16 if D6 ≥ 17). |
| 2 | Sequence Step Direction ("1" = backward, "0" = forward) |
| 3 | RUN/PAUSE select ("1" = pause, "0" = run) When this bit = 0, elapsed time for a step is allowed to accumulate. When bit = "1", time will not accumulate. |
| 4 | Automatic Step Advance Inhibit ("1" = hold data, "0" advance step). When bit = 0, outputs will assume the next state when conditions for an automatic step advance have been satisfied. When bit = 1, outputs will retain their previous state whether or not the automatic step advance conditions have been satisfied. |
| 5 | AUTO/MANUAL Select ("1" = manual operation, "0" = automatic operation). When in AUTO mode, sequencer is controlled by time/input advance information. When in MANUAL, sequencer advance is controlled by bit 7. |
| 6 | REPEAT/SINGLE PASS Select ("0" = single-pass, "1" = auto recycle). When bit = 0, sequencer will execute the sequence one time. At the conclusion of the sequence (the last step), all outputs will reset and the "current step" register D1 will indicate "0". When bit = 1, sequencer will proceed to step 1 after meeting all required conditions for advancing beyond the last step. |

-continued

| Register D2 Bit Number | Purpose |
|---|---|
| 7 | Manual Advance ("1" = advance, "0" = maintain). If bit 5 = 1, toggling this bit from "0" to "1" will advance the sequencer. |
| 8 | Sequential/Non-sequential ("1" = next step not sequential, "0" = next step sequential). When bit 8 = 1, the next step advance will be to the step indicated in D7. |
| 9 | Same as bit 8, except that the next step is indicated in register D8. |
| 10 | Time and/or Input condition Advance ("1" = OR, "0" = AND). When "0", step advance is enabled when input condition is satisfied ONLY AFTER the time advance condition has been met. When this bit = "1", the step advance is enabled when either the time or input conditions has been satisfied. |
| 11–16 | Spares (not currently used). |
| 17–32 | Status or Monitoring bits. |

As mentioned above, the sequencer requires the following actions: The two rungs in FIG. 2 must be entered. The LET rung must be executed every scan even when the sequencer is reset.

Whatever register is specified to the left of the "=" (equal) sign contains the current step number. For convenience zzzz should equal xxxx so that the sequencer can be located in the program by searching for the first register in the block.

The rung containing the RESET/ENABLE bit precedes the LET rung. Other rungs can then be used to preset register values or control bits.

The drum sequencer is executed during each scan of the ladder program, assuring program control of the outputs based on user-defined status. The sequencer operates as follows:

When the sequencer is RESET (D2 bit 1="0"), all outputs in the program that are specified by registers D5 and D6 in the sequencer are turned OFF. Current Step register (D1) is reset to "0". Current Step Running Time register D3 is also reset to "0".

When the sequencer is ENABLED (D2 bit 1="1"), the specified output states of step 1 (registers D13–D16) are transferred to the outputs defined by both the pointer register D5 and output width register D6. The Current Step Running Time (D3) register will begin to accumulate time.

Step conditions of the next advance contained in registers D11 and D12 are compared with the real-time states of the Current Step Running Time register D3, and with the bit pattern of the input register being pointed at by register D4. Bit 10 of the Operating Mode register is checked to determine if either or both conditions must be met prior to a step advance. The Current Step Running Time register accumulates time as long as it has not timed out (equals D11), or bit 3 of the operating mode register isn't set to "1".

During every scan, in conjunction with the above comparisons, the sequencer checks the status of bit 5 in the Operating Mode register D2. This is a check for AUTO or MANUAL operation. Whether in AUTO or MANUAL, the sequencer now knows what criteria to monitor when determining a step advance. Once the appropriate criteria for a step advance are satisfied, bit 4 of register D2 is checked to see if advance is inhibited.

If bit 4="0" (advance not inhibited), bits 8 and 9 of register D2 are checked to see if the advance will be nonsequential.

If advance is to be sequential, bit 2 of register D2 is checked to see if the advance will be incrementing or decrementing.

The sequencer checks to see if it has just completed a pass through the final step. If it has, then bit 6 of register D2 is also checked.

Finally, the output states for the appropriate step are written to the outputs being pointed at. The entire process then starts anew.

The operator controls the sequencer in the Manual Mode. The values of these drum sequencer control registers and bits can be changed by the user at any time.

As mentioned above, the sequencer has the capability of operating in a manual mode, a time mode, an event mode, and a combination time and event mode.

The manual sequencing mode provides override control by toggling bit 7 of register D2. In manual operation, bit 5 of register D2 is set to "1"; and in this manual operation, the sequencer is advanced by toggling bit 7 of register D2 from "0" to "1".

The time sequence mode operates based on time inputs. The following parameters apply for a time-advanced operation: The operation is automatic, so bit 5 of register D2="0". Since no Input Advance condition is used, register D12 (and D18/D24/etc., depending on the number of steps) is set to "0". Time Advance condition is entered into register D11 (and D17/D23/etc., depending on the number of steps). The time is entered in tenth-second (0.1 second) increments.

When bit 1 of register D2 is set to "1", the output pattern sequencer step 1 (registers D13 through D16) is written into the output register(s) being pointed at by registers D5 and D6.

When the time specified by register D11 has accumulated in register D3, the output pattern associated with sequencer step 2 (registers D19 through D22) are written into the output registers being pointed at by registers D5 and D6.

Register D3 will now reset and begins timing again. When the time specified by register D17 has accumulated in D3, the advance to step 3 occurs.

This process continues as long as bit 1 of register D2 is set to "1", and bit 5 of register D2 is set to "0". When the last step in the sequencer has been executed, bit 6 of register D2 is checked to determine whether the sequencer should wrap around to its step 1, or halt. If the sequencer halts (bit 6="0"), all outputs are turned OFF.

The time sequence mode can be modified as follows:

Instead of incrementing forward the sequencer can be set to operate in reverse by setting bit 2 of D2 to "1").

Upon step completion, non-sequential operation can be obtained (Bits 8 and 9 in register D2: bit 8 set to "1" will execute the next step according to register D7, while bit 9 set to "1" will non-sequentially execute the next step in accordance to the contents in register D8). Instantaneous non-sequential operation can also be obtained by altering register D1.

The Current Step Running time can be inhibited from timing by setting bit 3 of register D2 to "1".

A step advance inhibit is enabled by setting bit 4 of register D2 to "1". This inhibits an advance even if the time requirement for the advance has elapsed.

The event sequence mode operates based on event inputs. The following parameters apply to an input-advanced operation:

Operation is automatic, so bit 5 of register D2="5".

Load register D4 with the address of the input register being pointed at. This will be used for comparison to determine advance conditions. All Time Condition advance registers (D11, D17, etc.) should be set to "0". Input condition advance registers (D12, D18, etc.) should be preset with the bit pattern which, when compared to the register that is pointed at by D4, will allow a step advance.

When bit 1 of register D2 is set to "1", the output pattern associated with sequencer step 1 (registers D13 through D16) is written into the output register(s) pointed at by registers D5 and D6 (Step 1 Active).

Since D11=0, no check for equity to D3 is made and the time condition is ignored. The pattern of "1"s specified by register D12 is compared to the input register pointed at by register D4. When all the "1"s in D12 are matched by the register pointed at by D4, the output pattern associated with sequencer step 2 (registers D19 through D22) is written into the output register(s) being pointed at by D5 and D6 (Step 2 Active).

Since D17=0, step 2 will remain active until the pattern of "1s" specified by register D18 matches those of the input register pointed at by register D4, at which time the third step will be advanced to. This process continues as long as bit 1 of register D2 is set to "1" and bit 5 of register D2 is reset to "0".

After the last sequencer step is executed, bit 6 of register D2 is checked to determine whether the sequencer should "wrap around" to step 1 or halt. If the sequencer halts (bit 6="0"), all outputs are turned OFF.

Regardless of whether the sequencer is operating in the manual or automatic mode, the default incremental-forward stepping mode may be altered in the following four ways:

A. Backward advance (decrement step).
B. Non-sequential advance (i.e., jump to a step not immediately preceding or following the current step).
C. Immediate and unconditional non-sequential advance to another step, even though the advance conditions for the present step are not satisfied.
D. Inhibit a step advance, causing the current step to be maintained despite any conditions for advance that are satisfied.

To obtain Backwards (Decremental) Stepping, bit 2 of register D2 is set to "1", causing the sequencer to step backward. Decrementing from sequencer step 1 causes the sequencer to go to the last step of the sequence.

To obtain Non-Sequential Advance, set bit 8 of register D2 to "1", and load register D7 (pointer to non-sequential step) with the number of the next desired step, or set bit 9 of register D2 to "1" and load register D8 with the number of the next desired step. Bit 8/register D7 and bit 9/register D8 function identically; two pairs are provided for user convenience.

When either of these bit/register pairs is activated, the sequencer will go to the step specified in either register D7/D8 when the next step advance occurs. The number entered in these registers must be a valid step number (zero is not a valid step number); otherwise no advance takes place, outputs remain as defined for the current step, and bit 18 of register D2 is set to a"1" to indicate an error.

An Immediate and Unconditional Non-Sequential Advance is obtained by loading a step number into register D1 (Current Step Number) which causes the sequencer to jump unconditionally to that step upon the next program scan. The sequencer does this by storing the step executed during the previous scan in register D9.

At the beginning of each new scan, D9 is compared with D1. If they differ, a new step has been specified in D1. Normal sequencer operation resumes from that point register D3 resets and begins timing, and the Input Condition advance register for the new step is used for comparison.

To inhibit a step advance, set bit 4 of register D2 to "1". This prevents the sequencer from advancing beyond the current step, even if conditions for advance are satisfied when in the automatic mode.

The Automatic Step Advance Inhibit applies regardless of whether the step change is to be forward or backward.

As soon as bit 4 of register D2 is reset to "0", output control reverts to control of the automatic advance condition. For example, if the only condition for advance is inputs (which happen to be satisfied), the step advance will occur the instant that bit 4 is reset to "0".

Bit 4 only applies to automatic mode operation (bit 5 of register D2="0") and will not inhibit a manual or Non-Sequential or immediate Unconditional Non-sequential Non-sequential Step Advance.

The following is one example of the sequencers operating set-up and procedure:

Assume the following sequencer conditions for this first example:

| | |
|---|---|
| Number of Steps | 20 |
| Registers Required | 130 |
| Beginning Register Address | 0751 |
| Ending Register Address | 0880 |
| Output Register Address | 0004 |
| Output Width | 12 bits (register 4, bits 1-12) |
| Input Register Address | 0001 (any or all of the 16 bits can be used to establish advance conditions). |

Upon sequence initialization (step 1), bits 2, 3 and 4 of the output register (4) are to be set to "1". The initiation rungs needed are shown in FIG. 4.

In the first rung shown in FIG. 4, 0752-01 is the RESET/ENABLE bit for the sequencer. In the second rung, 0751 is the address that identifies the start of the register block. SPEC 65 identifies the special instruction as a sequencer, while 20 is the number of steps in the sequencer.

The following registers have to be set up for the first step (step 1) in Example One:

| | |
|---|---|
| 0752 (D2) | Operating Mode (assume for now the default value). |
| 0754 (D4) | Pointer to Input Register 0001. Preset to 1. |
| 0755 (D5) | Pointer to output Register |

| | -continued |
|---|---|
| | 0004. Preset to 4. |
| 0756 (D6) | Output Width Definition. Preset to 12. |
| 0761 (D11) | Time Condition Advance. Assume that bits 2-4 of register 0004 must be ON for 60 seconds to satisfy the time requirement. Preset to 600 (60 + 0.1 sec. increments) |
| 0762 (D12) | Input Condition Advance. Assume a step advance is enabled when bits 1, 3 and 4 of register 0001 are set to "1". Preset to 13. |
| 0763 (D13) | Step 1 Output States bit 1 through 16. Since bits 2, 3 and 4 of register 0004 will be set to "1", preset to 14 |
| 0754-0766 (D14-D16) | Step 1 Output States bits 17-64. Since the sequencer's output width is less than 17, these registers are not applicable. |

The remaining 19 steps in the sequencer are set up similarly and separately.

The operation of the sequencer based on the foregoing example set up is as follows:

Before bit 1 of register 0752 (D2) is energized, registers 0751 and 0753 will equal zero, and bits 1 through 12 of register 0004 will be reset to "0" every time the initiation rungs (see FIG. 4) are scanned.

When bit 1 of register 0752 is set to "1", the following occurs:

The sequencer sets register 0751 to "1". Output information in registers 0763 through 0766 is transferred to the output registers specified by 0755 (D5) and 0756 (D6). Since D5=4 and D6=12, bits 1 through 12 or register 0763 are transferred to bits 1 through 12 of register 0004 (see FIG. 5). Bits 13-16 of register 0004 remain unchanged.

Bit 23 of register 0752 is set to "1" for one scan.

Register 0753 (D3) begins to time (to be compared with register 0761) to determine Time Advance enable.

Figure 6:
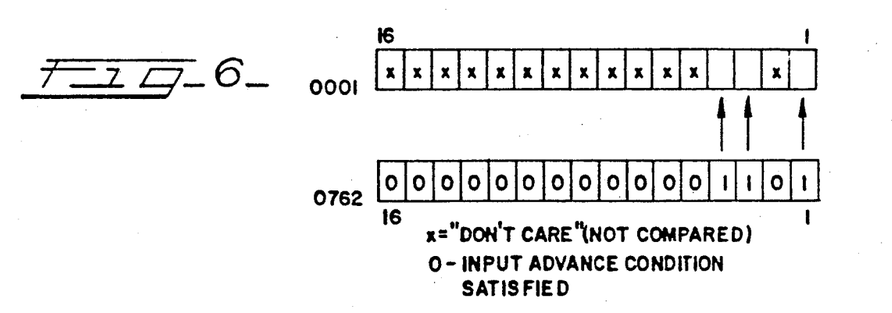

The bit pattern of register 0001 (the Input Register pointed at by register 0754) is compared to register 0762 to see if the condition for Input Advance is satisfied. The Input Advance will not enable a step advance until the time condition (register 0753=register 0761) has been satisfied (see FIG. 6).

Step advance to step 1 is now complete. Assuming no Operating Mode register bits when are set, the next step advance will occur when bits 1, 3 and 4 (specified in register 0762) of register 0001 (pointed at by register 0754) are set to "1". Before this comparison occurs however, the time condition for advance (60 seconds) must be satisfied.

Sequencer step 2. Assume the initial conditions of this example are unchanged and that no Operating Mode register bits are set to "1". The output bit pattern for step 2 is fixed such that bits 1, 4 and 5 of register 0004 are to be set to '1" (all other bits "0").

Figure 7:
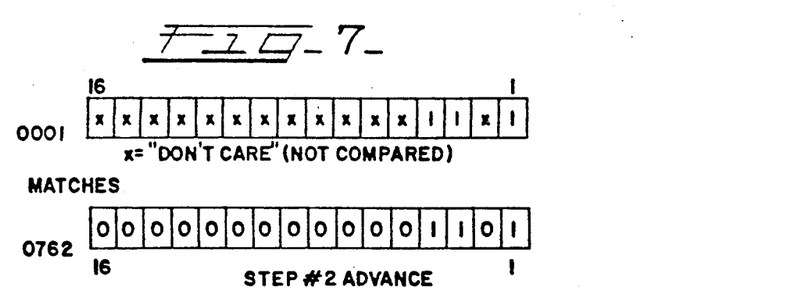
Figure 8:
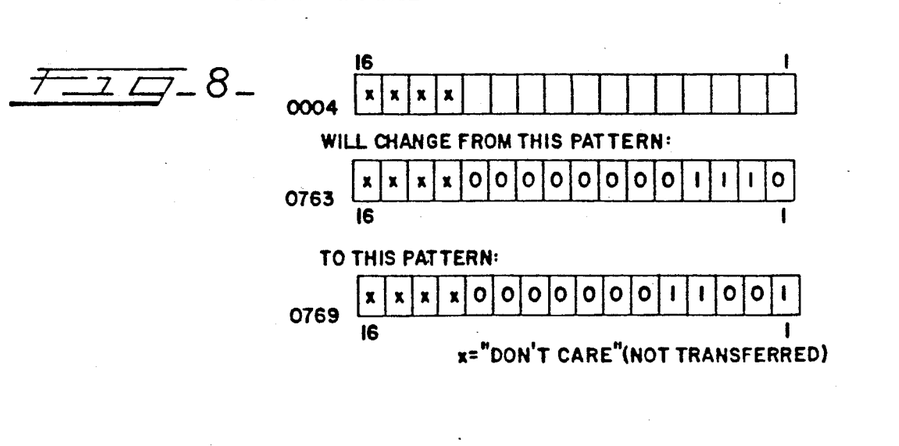

When register 0001 matches register 0762, and register 0753≧register 0761 (step 1 has been running for at least 60 seconds), the register will change as shown in FIGS. 7 and 8.

After the sequencer is enabled, a variety of operating modes can be selected by altering the bits in the Operation Mode register (register 0752). The possibilities are as follows:

Reverse Sequencing is obtained by setting bit 2 of register 0752 to "1", and the sequencer will run backwards. If the sequencer is currently at step 1, enabling bit 2 will advance the sequencer to step 20 (the last step) instead of to step 2.

To prevent Time Accumulation set bit 3 of register 0752 to "1" and no time will accumulate in the Current Step Running Time register (0753).

To inhibit a Step Advance, bit 4 of register 0752 is set to "1" and the sequencer will not advance from the current step - even if time (register 753=600) and/or input (bit 1, 3 and 4 of register 0001="1") conditions are satisfied. Also, output register 0004 will not change.

To obtain manual operation, bit 5 of register 0752 is set to "1" and the sequencer will ignore both time and input advance conditions. Toggle bit 7 of register 0752 to manually step the sequencer.

To obtain non-sequential stepping, bits 8 and 9 of register 0752 are used to make the sequencer jump to a step that is not in numerical order (for example, jump from step 1 to step 4, ignoring 2 and 3). Register 0757 or 0758 will need to be loaded with a valid step number (1 to 20), otherwise the current step will be maintained. If bit 8 or 9 of 0752 is set, and advance conditions are satisfied, the sequencer jumps to the step specified in register 0757 (if bit 8 is set) or register 0758 (if bit 9 is set).

To obtain either time or input condition advance, bit 10 of register 0752 is set to "1" and a step advance will be enabled as soon as either register 0753=600 (60 seconds) or bits 1, 3 and 4 of register 0001 are set to "1".

Figure 9:
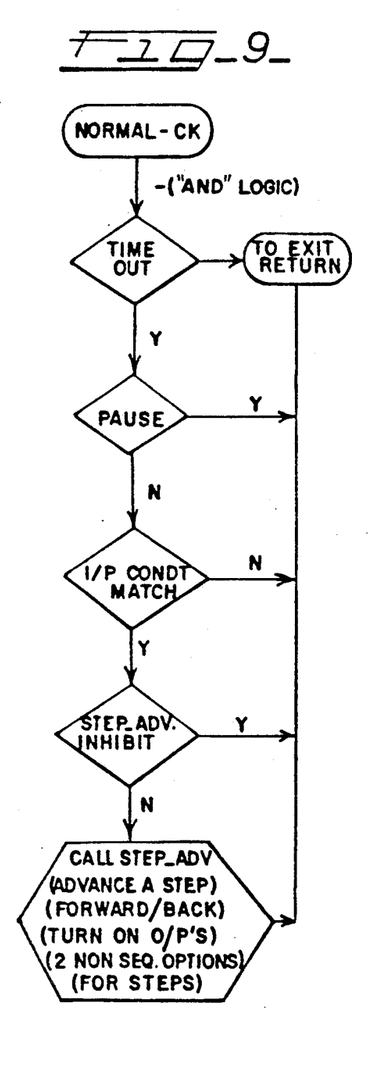
FIGS. 9 and 10 are flow charts depicting the operation of the inventive drum sequencer.
Figure 10:
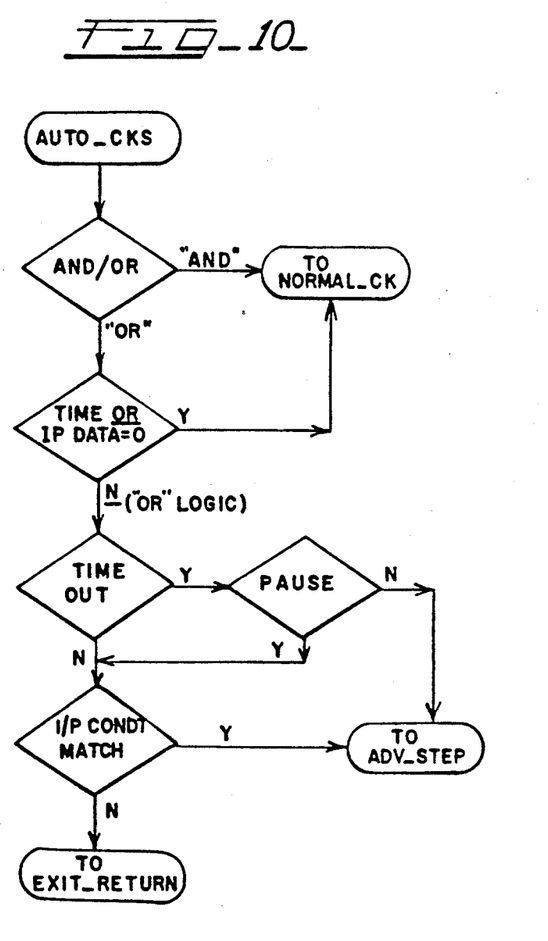

FIGS. 9 and 10 show self-explanatory flowcharts or diagrams depicting operating steps for the sequencer. Importantly, as indicated in the flowcharts and described above, sequencing may be performed forwardly, backwardly or non-sequentially. A step advance may be based on time or on up to 16 input events; or, the step advanced may be based both on time and/or event. The time accumulated during a step may be held or paused. Output state changes may be inhibited despite step completion. Further, a sequence may be repeated or halted.

While the invention has been particularly shown and described with reference to a preferred embodiment thereof, it will be understood by those skilled in the art that various changes in form and detail may be made therein without departing from the spirit and scope of the invention.

We claim:

1. A drum sequence controller for outputting control information to sequentially perform a series to steps based selectively on one of a plurality of valid conditions, said drum sequence controller adapted to thereby control the operation of a plurality of devices over a communications system bus, said drum sequence controller comprising:
   a control processor:
   a memory including a plurality of registers:
   a first plurality of said registers providing configuration table registers, said configuration table registers providing control and status of current step, said configuration table registers include means for incrementing said steps in a forward sequence, and:
   said configuration table registers include means for decrementing said steps in a reverse sequence; and a second plurality of said registers comprising step or table registers, said step or table registers indicating a step increment or decrement based selectively on one of said plurality of valid conditions, said plurality of valid conditions based on time, event, a combination of time and event, or one of time or event, said event being an input, and said step or table registers providing step increments or decrements for a plurality of said steps.

2. The drum sequence controller of claim 1, wherein said configuration table include register means for defining one of said steps which responds to an input or a predetermined time period to control the operation of a plurality of devices.

3. The drum sequence controller of claim 1, wherein said configuration table registers includes a selected size bit register, and said step or table register specifies output data with, from 1 to 64 bits, by utilizing two or more registers.

4. The drum sequence controller of claim 1, wherein the sequence of processable steps is possible for at least 255 steps.

5. A drum sequence controller for outputting control information to sequentially perform a series of steps, each of which consists of an input and an output, said steps selectively based on time, event, a combination of time and event, or one of time or event, the drum sequence controller comprising:
  configuration table registers for storing data defining step operating conditions for each of said steps, said step operating conditions data including a number identifying the step currently being performed, sequence operating conditions, total time the current step has been executing, an address of an input from which said event is to be determined, and an address of an output to which said control information is to be sent;
  a plurality of sets of step table registers, each of said sets defining one of said steps to be performed:
  means responsive to said configuration table registers and said sets of step table registers for selectively executing each of said steps: and
  means for executing an out-of-sequence step wherein said configuration table registers include a register operative as a pointer for executing said out-of-sequence step.

6. The drum sequence controller of claim 5, wherein said sequence operating conditions includes data defining whether said sequential performance of said steps shall be incremented forwardly or decremented backwardly.

* * * * *